(12) United States Patent
Castinado et al.

(10) Patent No.: US 12,244,892 B2
(45) Date of Patent: Mar. 4, 2025

(54) SYSTEMS, METHODS, AND APPARATUSES FOR ANALYZING, USING AI ENGINES, RESOURCES DEPICTED IN AUDIO VISUAL CONTENT

(71) Applicant: BANK OF AMERICA CORPORATION, Charlotte, NC (US)

(72) Inventors: Joseph Benjamin Castinado, North Glenn, CO (US); Hope Barus, Fort Mill, SC (US); Oscar Guzman, Dallas, TX (US); Brandon Ingram, Charlotte, NC (US); Naoll Addisu Merdassa, Chakopee, MN (US); Kevin Graham Robberts, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/096,761

(22) Filed: Jan. 13, 2023

(65) Prior Publication Data
US 2024/0244293 A1 Jul. 18, 2024

(51) Int. Cl.
*H04N 21/442* (2011.01)
*G06F 16/951* (2019.01)
*H04N 21/2389* (2011.01)

(52) U.S. Cl.
CPC ..... *H04N 21/44218* (2013.01); *G06F 16/951* (2019.01); *H04N 21/23892* (2013.01)

(58) Field of Classification Search
CPC ........ H04N 21/44218; H04N 21/23892; G06F 16/951
See application file for complete search history.

(56) References Cited

U.S. PATENT DOCUMENTS

| | | |
|---|---|---|
| 8,740,688 B2 | 6/2014 | Walker et al. |
| 8,832,746 B2 | 9/2014 | Pack et al. |
| 8,910,201 B1 * | 12/2014 | Zamiska ............... H04N 21/458 725/60 |
| 8,949,889 B1 | 2/2015 | Erdmann |
| 8,977,104 B2 | 3/2015 | Lewis, II |
| 9,094,692 B2 | 7/2015 | Zises |
| 9,277,157 B2 | 3/2016 | Averbuch |
| 9,317,778 B2 | 4/2016 | Cordova-Diba et al. |
| 9,319,745 B2 | 4/2016 | Rankine |
| 9,380,282 B2 | 6/2016 | Abecassis |
| 9,679,332 B2 | 6/2017 | Kim et al. |

(Continued)

*Primary Examiner* — Mulugeta Mengesha
(74) *Attorney, Agent, or Firm* — Moore & Van Allen PLLC; Anoohya Yarlagadda

(57) ABSTRACT

Embodiments of the present invention provide a system for analyzing using artificial intelligence engines depicted in audio visual content. The system is configured for determining that a user has accessed a first audio visual content on an audio visual content providing platform, performing a frame-by-frame analysis to determine one or more resources depicted in the first audio visual content, identifying one or more third party systems associated with the one or more resources, crawling the one or more third party systems associated with the one or more resources, extracting resource information associated with the one or more resources from the one or more third party systems based on crawling the one or more third party systems, and embedding the resource information associated with the one or more resources in the first audio visual content.

20 Claims, 6 Drawing Sheets

(56) References Cited

U.S. PATENT DOCUMENTS

| | | | |
|---|---|---|---|
| 9,706,258 B2 * | 7/2017 | White | H04N 21/64322 |
| 9,711,182 B2 | 7/2017 | Dharssi et al. | |
| 9,955,206 B2 | 4/2018 | Jones et al. | |
| 10,055,783 B1 | 8/2018 | Feinstein | |
| 10,257,569 B2 * | 4/2019 | Kim | H04N 21/8133 |
| 10,268,994 B2 * | 4/2019 | Spitz | G06Q 30/0277 |
| 10,319,022 B2 | 6/2019 | Clayton et al. | |
| 10,387,857 B2 | 8/2019 | Kim et al. | |
| 10,419,790 B2 | 9/2019 | Gersten | |
| 10,462,535 B2 | 10/2019 | Carter et al. | |
| 10,491,956 B2 | 11/2019 | Moehrle | |
| 10,614,504 B2 | 4/2020 | Wilkinson et al. | |
| 10,623,783 B2 | 4/2020 | Barnett | |
| 10,779,037 B2 | 9/2020 | Li et al. | |
| 10,872,326 B2 | 12/2020 | Garner | |
| 10,936,898 B2 | 3/2021 | Jouhikainen et al. | |
| 10,991,165 B2 | 4/2021 | Altieri | |
| 11,134,316 B1 * | 9/2021 | Pavlosky | H04N 21/47815 |
| 2012/0099841 A1 * | 4/2012 | Lee | H04N 21/4325 386/249 |
| 2018/0330413 A1 | 11/2018 | Fitzsimmons et al. | |
| 2019/0037254 A1 * | 1/2019 | Fennelly | H04N 21/6581 |
| 2020/0275147 A1 | 8/2020 | Pizzurro et al. | |
| 2021/0326967 A1 * | 10/2021 | Geekee | G06V 20/41 |
| 2022/0406030 A1 | 12/2022 | Zheng et al. | |

\* cited by examiner

SYSTEMS, METHODS, AND APPARATUSES FOR ANALYZING, USING AI ENGINES, RESOURCES DEPICTED IN AUDIO VISUAL CONTENT

BACKGROUND

Conventional systems do not have the capability to analyze audio visual content and determine resources that are depicted in audio visual content. As such, there exists a need for a system that analyzes audio visual content to automatically detect resources depicted in audio visual content, and embed information associated with the resources in the audio visual content.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically determining resources depicted in audio visual content using artificial intelligence engines. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user has accessed a first audio visual content on an audio visual content providing platform, performs a frame-by-frame analysis to determine one or more resources depicted in the first audio visual content, identifies one or more third party systems associated with the one or more resources, crawls the one or more third party systems associated with the one or more resources, extracts resource information associated with the one or more resources from the one or more third party systems based on crawling the one or more third party systems, and embeds the resource information associated with the one or more resources in the first audio visual content.

In some embodiments, the present invention determines that the user is playing the first audio visual content and displays the resource information embedded in the first audio visual content.

In some embodiments, the present invention displays the resource information on the first audio visual content while the user is playing the first audio visual content.

In some embodiments, the present invention displays the resource information after determining that the user has paused the first audio visual content.

In some embodiments, the present invention displays the resource information on the first audio visual content, wherein the resource information overlaps the first audio visual content.

In some embodiments, the present invention displays the resource information on a separate user interface.

In some embodiments, the present invention continuously tracks facial expressions, voice signatures, and one or more movements of the user while the user is playing the first audio visual content.

In some embodiments, the present invention in response to displaying the resource information, continuously track facial expressions, voice signatures, and one or more movements of the user, analyzes the facial expressions, the voice signatures, and the one or more movements of the user to determine that the user is interested in acquiring the one or more resources associated with the resource information displayed to the user, and automatically redirects the user to a third party user interface provided by the one or more third party systems associated with the one or more resources.

In some embodiments, the audio visual content providing platform is a web based application.

In some embodiments, the audio visual content providing platform is a mobile application.

In some embodiments, the audio visual content providing platform is a streaming service platform.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
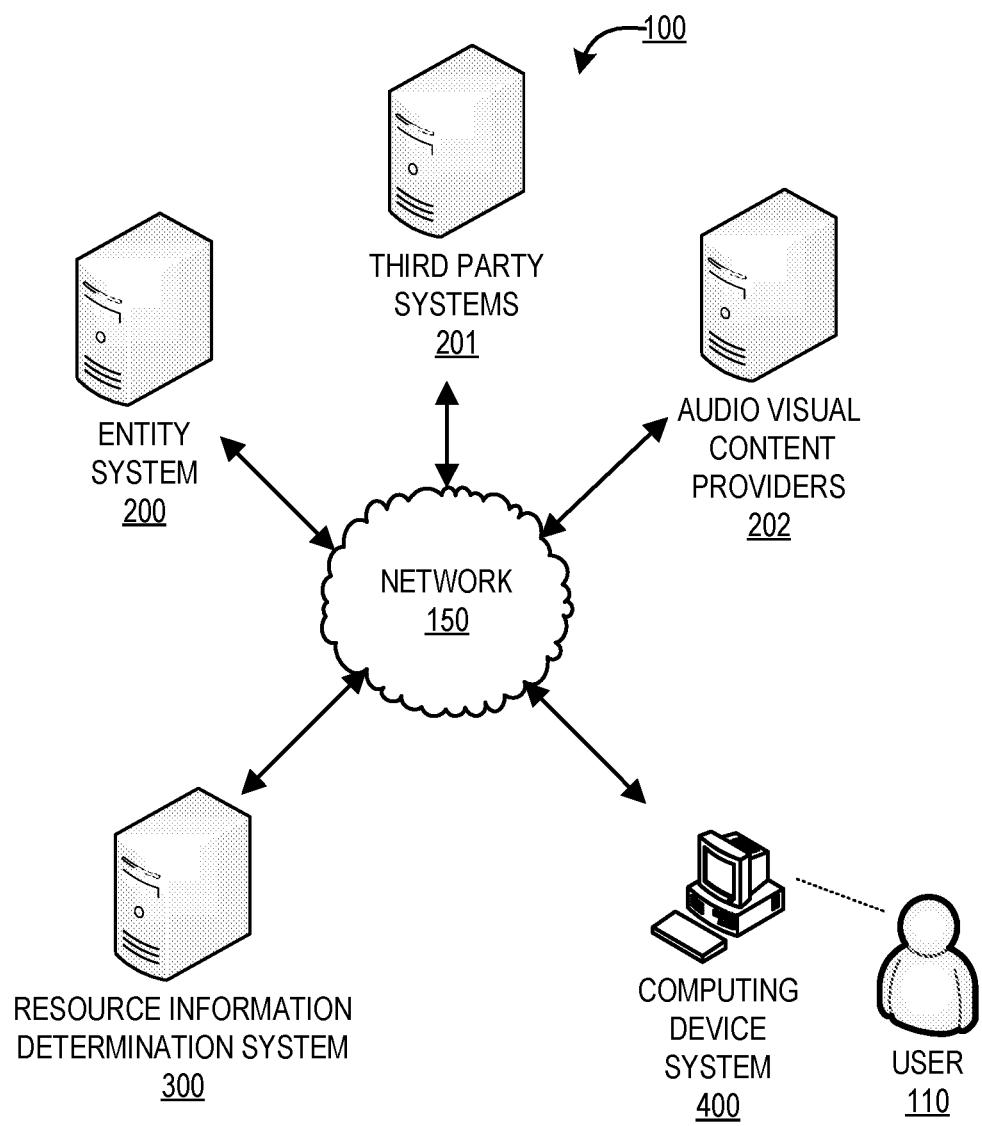
Figure 2:
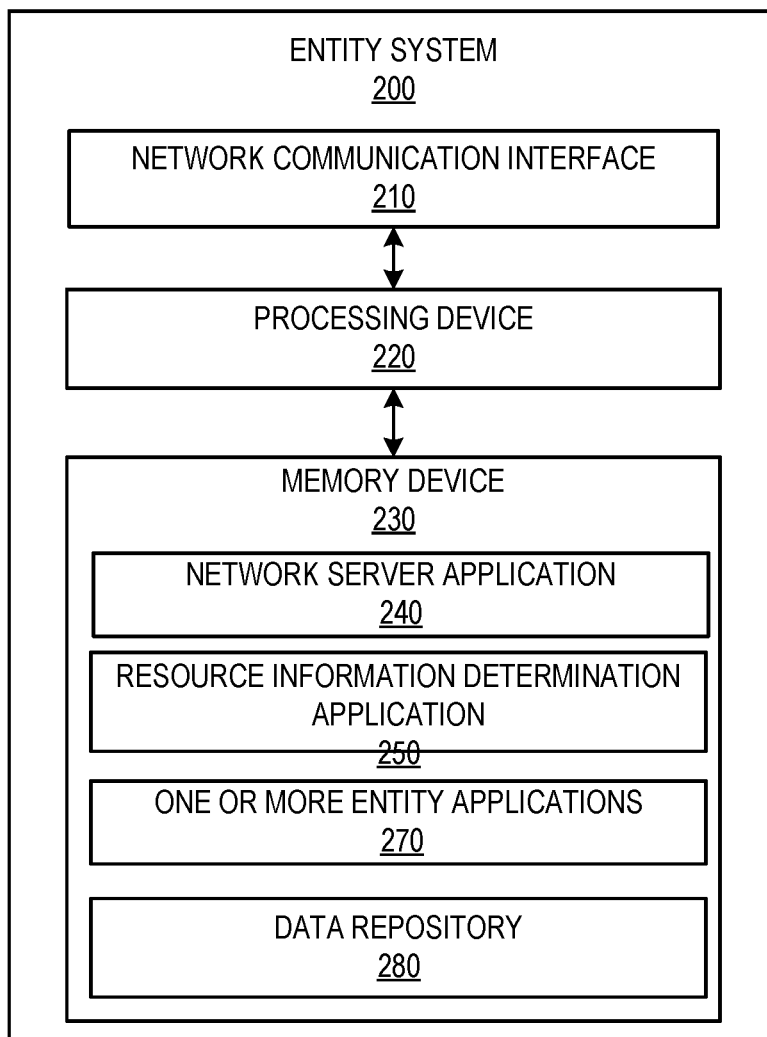
Figure 3:
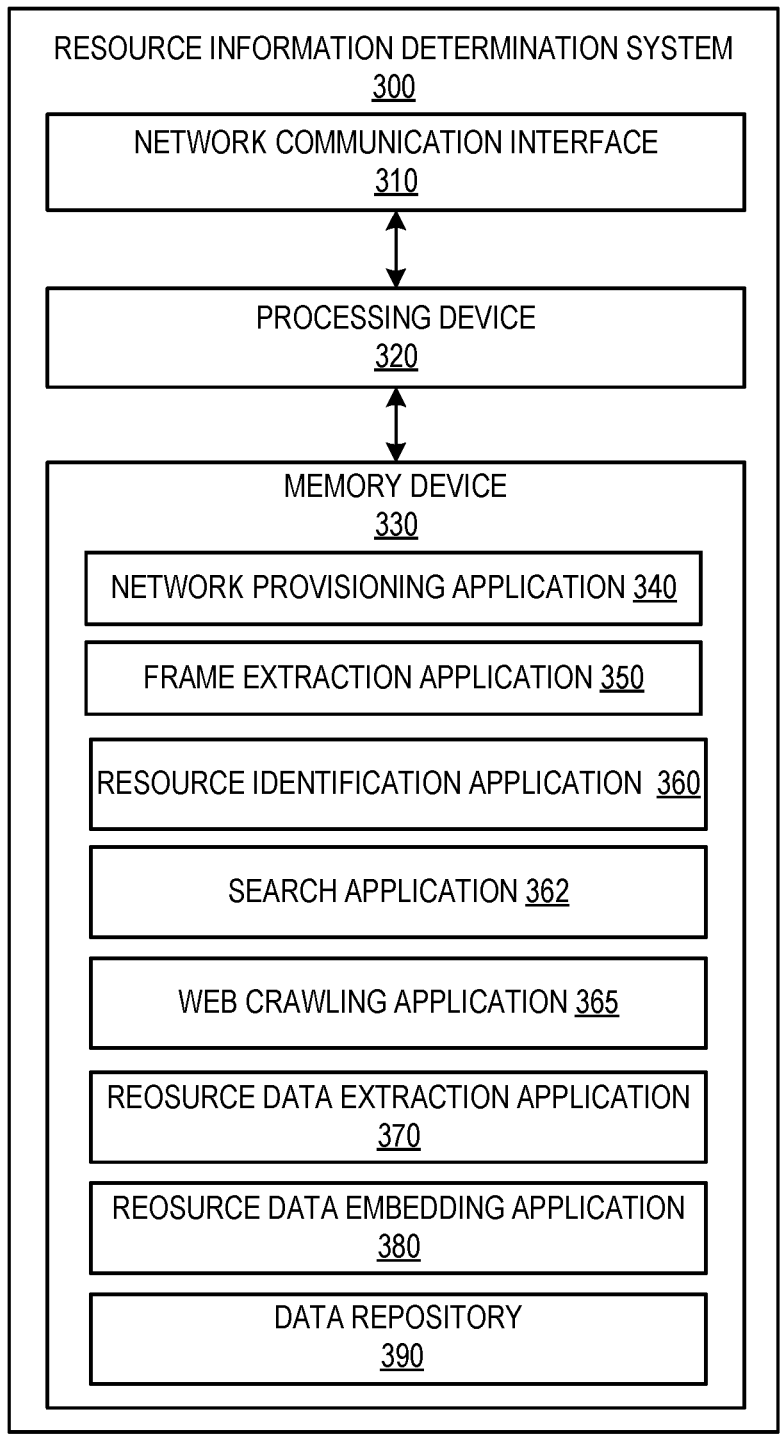
Figure 4:
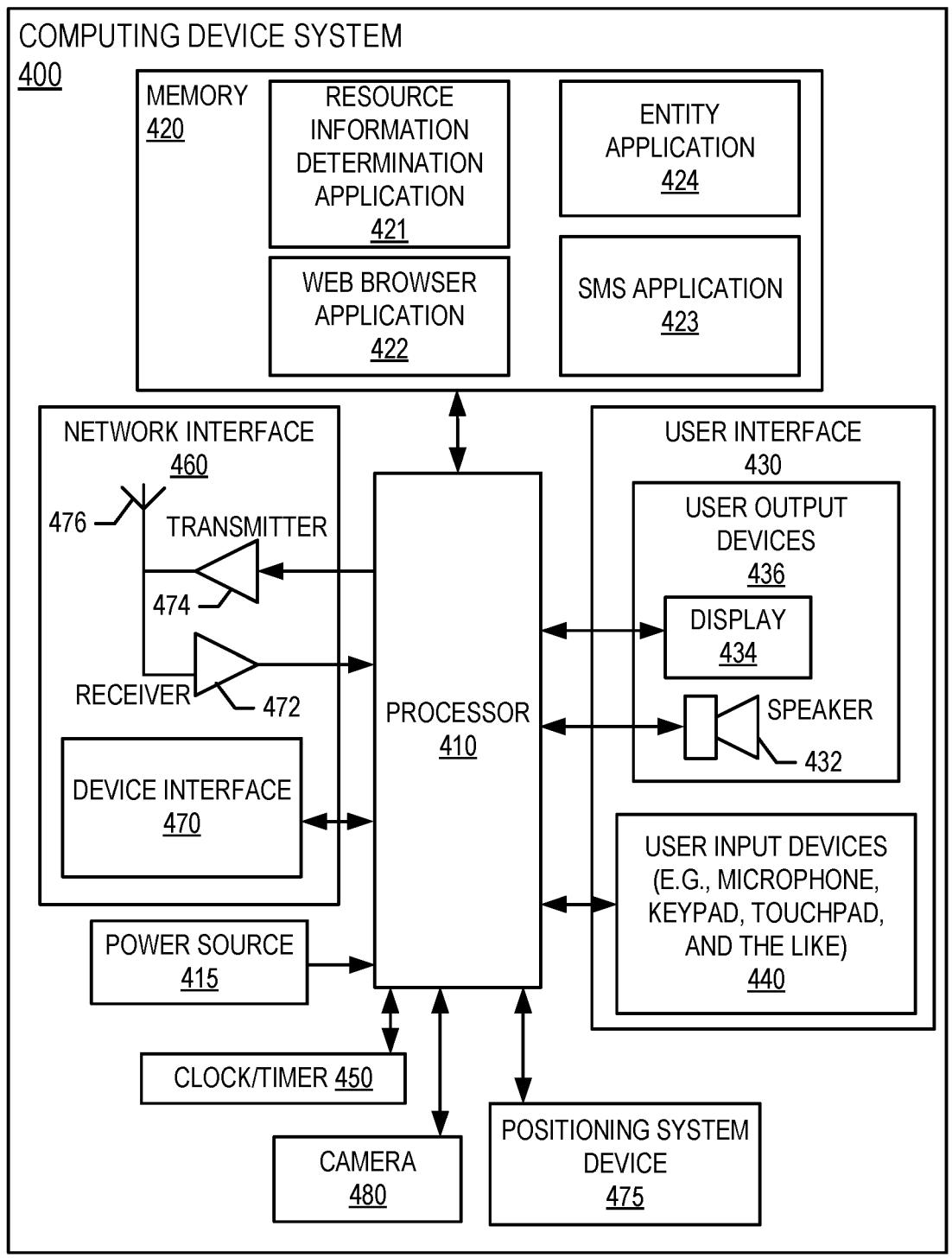
Figure 5:
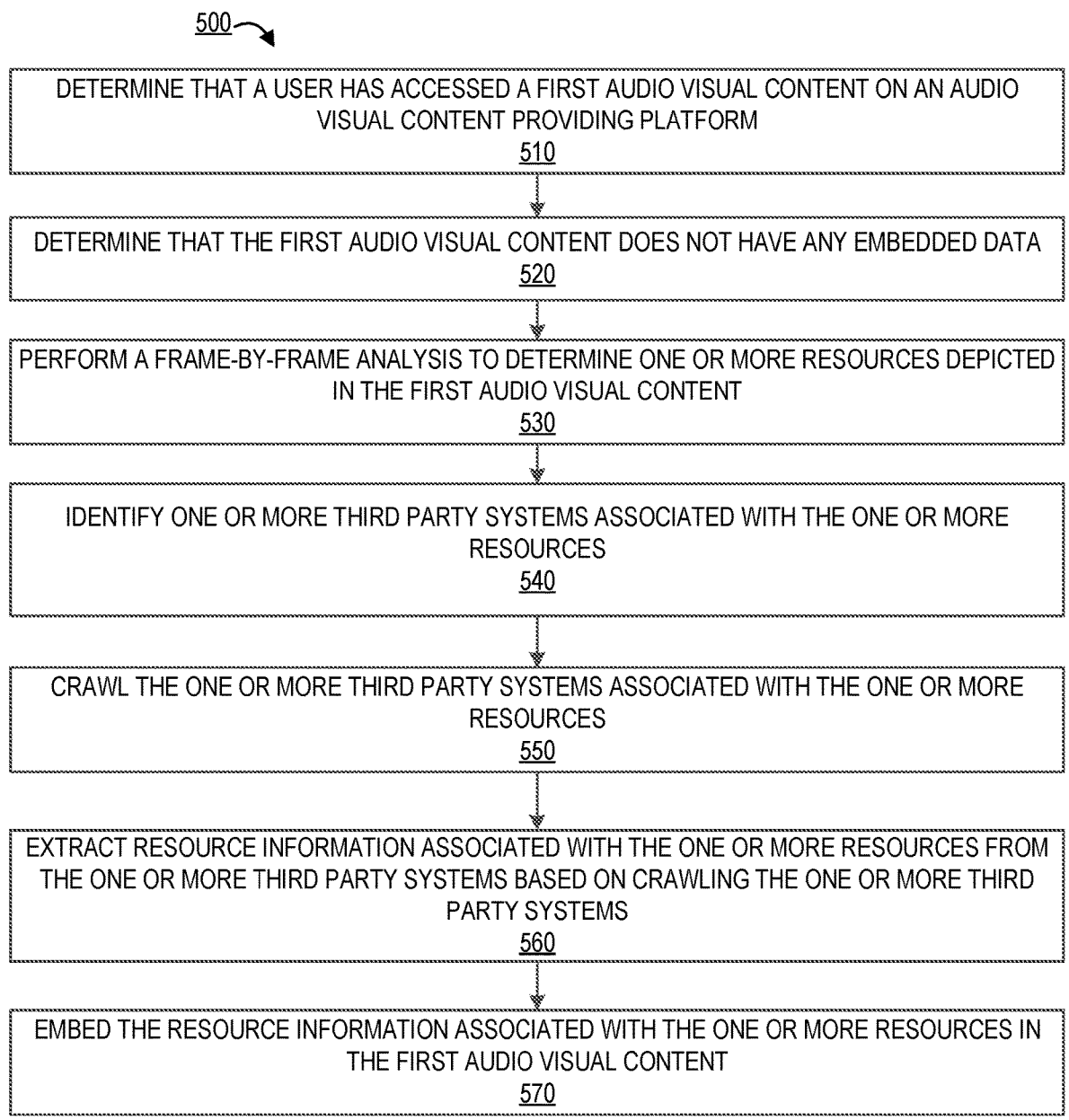
Figure 6:
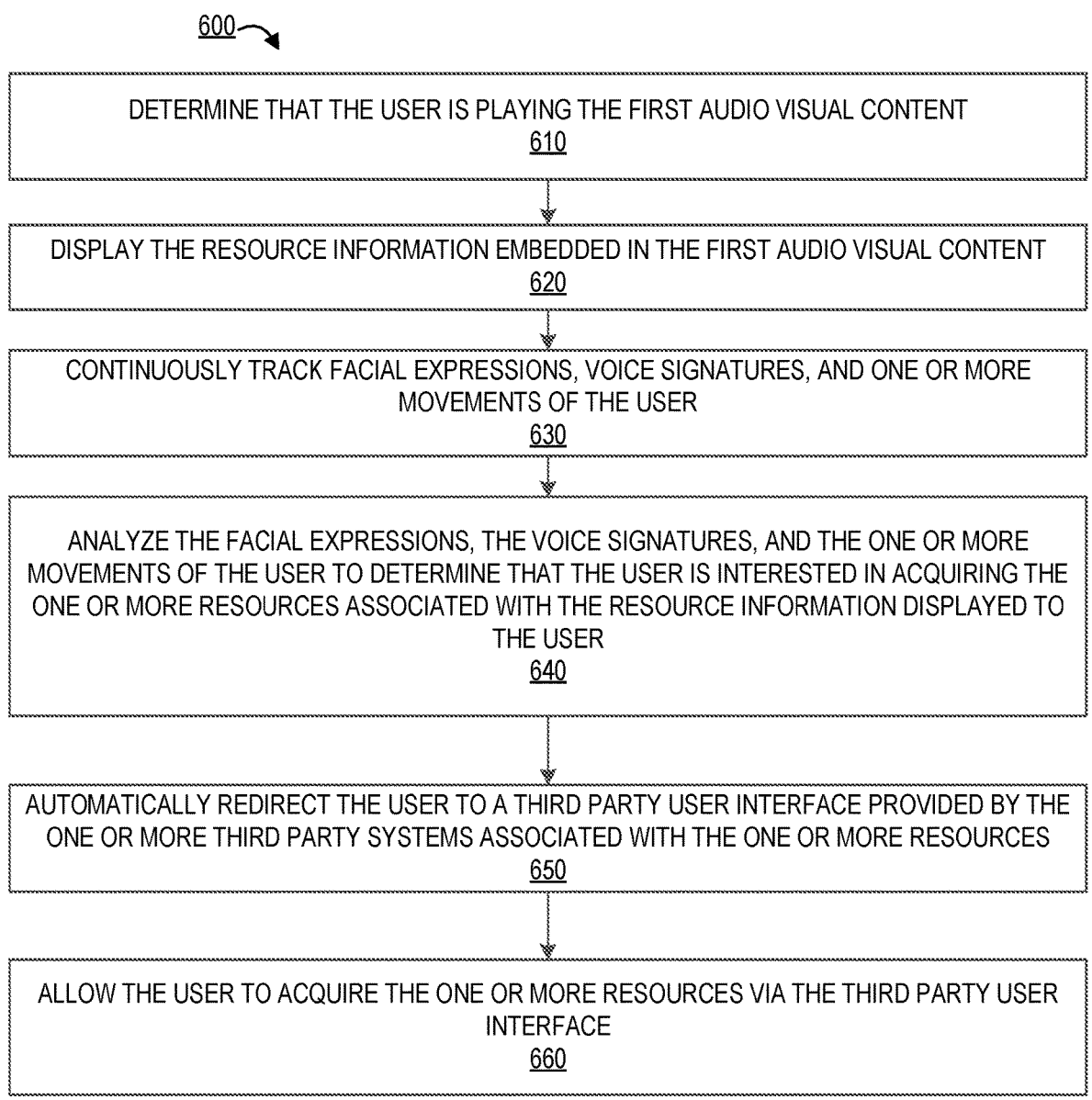

Having thus described embodiments of the invention in general terms, reference will now be made the accompanying drawings, wherein:

FIG. 1 provides a block diagram illustrating a system environment for analyzing using artificial intelligence engines depicted in audio visual content, in accordance with an embodiment of the invention;

FIG. 2 provides a block diagram illustrating the entity system 200 of FIG. 1, in accordance with an embodiment of the invention;

FIG. 3 provides a block diagram illustrating a resource information determination system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for dynamically determining resources depicted in audio visual content using artificial intelligence engines, in accordance with an embodiment of the invention; and FIG. 6 provides a block diagram illustrating the process of displaying resource information associated with the resources in the audio visual content and allowing a user to acquire the resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be a financial institution which may include herein may include any financial institutions such as commercial banks, thrifts, federal and state savings banks, savings and loan associations, credit unions, investment companies, insurance companies and the like. In some embodiments, the entity may be a financial institution that maintains, manages, or provides services to third party entities that sell products, goods, services, or the like to users (e.g., merchants), where the users may or may not be customers of the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to customer or a potential customer of the entity. In some embodiments, the user may not be a customer of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, audio visual content provided by audio visual content providers (e.g., streaming platforms) may contain various resources (e.g., products, goods, services, or the like). Currently no system exists that can determine resources depicted in audio visual content, provide additional information associated with the resources, and allow users to seamlessly acquire the resources. The system of the present invention solves these problems as explained in detail below.

FIG. 1 provides a block diagram illustrating a system environment 100 for dynamically determining resources depicted in audio visual content using artificial intelligence engines, in accordance with an embodiment of the invention. As illustrated in FIG. 1, the environment 100 includes a resource information determination system 300, an entity system 200, one or more third party systems 201, audio visual content providers 202, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may not be customers of the entity. In some embodiments, the one or more users 110 may be potential customers of the entity. In some embodiments, the one or more users 110 may be customers of the third party entity. The one or more third party systems 201 may be associated with third party entities (e.g., merchants) that provide resources to users 110. The audio visual content providers 202 may be any providers that provide audio visual content to users. In some embodiments, the audio visual content providers 202 may be audio visual content providing platform, where audio visual content providing platform may be a web based application, mobile application, a streaming service platform, or the like.

The entity system(s) 200 may be any system owned or otherwise controlled by an entity to support or perform one or more process steps described herein. In some embodiments, the entity is a financial institution. In some embodiments, the entity may be a non-financial institution.

The resource information determination system 300 is a system of the present invention for performing one or more process steps described herein. In some embodiments, the resource information determination system 300 may be an independent system. In some embodiments, the resource information determination system 300 may be a part of the entity system 200.

The resource information determination system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the resource information determination system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the resource information determination system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a resource information determination application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the resource information determination application 250, the one or more entity application 270 to perform certain logic, data-extraction, and data-storing functions of the entity system 200 described herein, as well as communication functions of the entity system 200.

The network server application 240, the resource information determination application 250, and the one or more entity applications 270 are configured to store data in the data repository 280 or to use the data stored in the data repository 280 when communicating through the network communication interface 210 with the resource information determination system 300, and/or the computing device system 400 to perform one or more process steps described herein. In some embodiments, the entity system 200 may receive instructions from the resource information determination system 300 via the resource information determination application 250 to perform certain operations. The resource information determination application 250 may be provided by the resource information determination system 300. The one or more entity applications 270 may be any of the applications used, created, modified, facilitated, and/or managed by the entity system 200.

FIG. 3 provides a block diagram illustrating the resource information determination system 300 in greater detail, in accordance with embodiments of the invention. As illustrated in FIG. 3, in one embodiment of the invention, the resource information determination system 300 includes one or more processing devices 320 operatively coupled to a network communication interface 310 and a memory device 330. In certain embodiments, the resource information determination system 300 is operated by an entity, such as a financial institution. In some embodiments, the resource information determination system 300 is operated by an entity, such as a non-financial institution. In some embodiments, the resource information determination system 300 is owned or operated by the entity of the entity system 200. In some embodiments, the resource information determination system 300 may be an independent system. In alternate embodiments, the resource information determination system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource information determination system 300 described herein. For example, in one embodiment of the resource information determination system 300, the memory device 330 includes, but is not limited to, a network provisioning application 340, a frame extraction application 350, a resource identification application 360, a search application 362, a web crawling application 365, a resource data extraction application 370, a resource data embedding application 380, and a data repository 390 comprising data processed or accessed by one or more applications in the memory device 330. The computer-executable program code of the network provisioning application 340, the frame extraction application 350, the resource identification application 360, the search application 362, the web crawling application 365, the resource data extraction application 370, and the resource data embedding application 380 may instruct the processing device 320 to perform certain logic, data-processing, and data-storing functions of the resource information determination system 300 described herein, as well as communication functions of the resource information determination system 300.

The network provisioning application 340, the frame extraction application 350, the resource identification application 360, the search application 362, the web crawling application 365, the resource data extraction application 370, and the resource data embedding application 380 are configured to invoke or use the data in the data repository 390 when communicating through the network communication interface 310 with the entity system 200, and/or the computing device system 400. In some embodiments, the network provisioning application 340, the frame extraction application 350, the resource identification application 360, the search application 362, the web crawling application 365, the resource data extraction application 370, and the resource data embedding application 380 may store the data extracted or received from the entity system 200, and the computing device system 400 in the data repository 390. In some embodiments, the network provisioning application 340, the frame extraction application 350, the resource identification application 360, the search application 362, the web crawling application 365, the resource data extraction application 370, and the resource data embedding application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a resource information determination application 421, entity application 424. These applications also typically instructions to a graphical user interface (GUI) on the display 430 that allows the user 110 to interact with the entity system 200, the resource information determination system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the resource information determination application 421 provided by the resource information determination system 300 allows the user 110 to access the resource information determination system 300. In some embodiments, the entity application 424 provided by the entity system 200 and the resource information determination application 421 allow the user 110 to access the functionalities provided by the resource information determination system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for dynamically determining resources depicted in audio visual content using artificial intelligence engines, in accordance with an embodiment of the invention.

As shown in block 510, the system determines that a user has accessed a first audio visual content on an audio visual content providing platform. The audio visual content may be any content comprising visual imagery and/or sound provided by audio visual content providing platforms. Examples of audio visual content may include, but are not limited to, motion pictures, live prerecorded radio or television programs, prerecorded radio or television programs, slide shows, filmstrips, audio recording, multimedia presentations, and/or the like. In one example, the user may access an audio visual content providing platform using any of user devices (e.g., mobile phone, television, computer, augmented reality devices, virtual reality devices, and/or the like) and may access a motion picture. In some embodiments, the audio visual content providing platform may be a web based application. In some embodiments, the audio visual content providing platform may be a mobile application. In some embodiments, the audio visual content providing platform may be a streaming service. In some embodiments, the audio visual content providing platform may be provided by an audio visual content providing system, where the system of the present invention provides a downloadable plugin to the audiovisual content providing system. The downloadable plugin may automatically perform one or more operations and/or cause the audio visual content providing system to perform one or more functions that implement the process flow described herein.

As shown in block 520, the system determines that the first audio visual content does not have any embedded data. In some embodiments, the system may automatically implement the process flow 500 for all audio visual content provided by the audio visual content providing platform. In some embodiments, the system may implement the process flow 500 in real-time after determining that user has accessed a first audio visual content. In some embodiments, the system may automatically determine that a user may watch a set of audio visual content and may implement the process flow 500 for such content. In some such embodiments, the system may determine the set of audio visual content based on historical data, likes and dislikes of the user, genre of the audio visual content, and/or any other information provided by audio visual content providing system. In some embodiments, after the user has accessed the first audio visual content, the system may determine that the first audio visual content does not have any embedded data and may proceed to block 530.

As shown in block 530, the system performs a frame-by-frame analysis to determine one or more resources depicted in the first audio visual content. The system may extract data, metadata, or the like associated with the first audio visual content to perform frame-by-frame analysis, where each instance of the first audio visual content is analyzed by the system using artificial intelligence engine or machine learning algorithms to identify the one or more resources (e.g., goods, products, services, or the like) depicted in the first audio visual content. In some embodiments, the system may use deep leaning techniques to perform the frame-by-frame analysis.

As shown in block 540, the system identifies one or more third party systems associated with the one or more resources. The system may determine a type of the one or more resources via the artificial intelligence engine and may identify the one or more third party entities/systems that provide the one or more resources. For example, the system may identify sunglasses in the first audio visual content and may determine all merchants that sell sunglasses. It should be understood that the examples described herein are for explanatory purposes only and in no way delineate the scope of the invention.

As shown in block 550, the system crawls the one or more third party systems associated with the one or more resources. As shown in block 560, the system extracts resource information associated with the one or more resources from the one or more third party systems based on crawling the one or more third party systems. The system then crawls the internet and the one or more third party systems to extract information associated with the one or more resources (e.g., specifications, features, pricing, discounts, payment options, web link for purchasing the resources, or the like).

As shown in block 570, the system embeds the resource information associated with the one or more resources in the first audio visual content. The system embeds the extracted information into the first audio visual content. In some embodiments, the system may tag the extracted information to the resources in the first audio visual content. In some embodiments, the system may provide the extracted information as a separate file, where the extracted resource information in the file is tagged to the instance where the resource appears in the first audio visual content such that the resource information is instantaneously extracted and ready to be displayed while the user is playing the first audio visual content.

FIG. 6 provides a block diagram illustrating the process of displaying resource information associated with the resources in the audio visual content and allowing a user to acquire the resources, in accordance with an embodiment of the invention.

As shown in block 610, the system determines that the user is playing the first audio visual content. The system may communicate with the audio visual content providing system/platform to determine that the user is playing the first audio visual content. As shown in block 620, the system displays the resource information embedded in the first audio visual content. In some embodiments, the system may display the resource information on the first audio visual content while the user is playing the first audio visual content. In some embodiments, the system displays the resource information after determining that the user has paused the first audio visual content. In some such embodiments, the system displays the resource information on the first audio visual content, wherein the resource information overlaps the first audio visual content. In some embodiments, the system displays the resource information on a separate user interface.

In some other embodiments, the system may display the resource information based on the type of the audio visual content providing platform and the user device used by the user. For example, the system may determine that the user is viewing the first audio visual content via a computer and a web based platform, the system may display the resource information adjacent to the video player in a the graphical user interface provided by the web based platform. In another example, the system may determine that the user is viewing the first audio visual content via an augmented reality device and a augmented reality platform, the system may display the resource information in the augmented reality environment.

As shown in block 630, the system continuously tracks facial expressions, voice signatures, and one or more movements of the user. In some embodiments, the system may continuously track facial expressions, voice signatures, and one or more movements of the user, via the user device, in response to identifying that the user is playing the first audio visual content to determine that the user is interested in a resource in the first audio visual content. Based on determining that the user is interested in the resource, the system may then display the resource information associated with the resource to the user. In some embodiments, the system may continue to track the facial expression, the voice signatures, and the one or more movements of the user in response to displaying the resource information.

As shown in block 640, the system analyzes the facial expressions, the voice signatures, and the one or more movements of the user to determine that the user is interested in acquiring the one or more resources associated with the resource information displayed to the user. The system may further analyze the facial expressions, the voice signatures, and the one or more movements of the user to determine user's interest towards the resource after displaying the resource information. In some embodiments, the system may utilize artificial intelligence engine and machine learning models to analyze the facial expressions, the voice signatures, and the one or more movements of the user.

As shown in block 650, the system automatically redirects the user to a third party user interface provided by the one or more third party systems associated with the one or more resources. The third party user interface allows the user to acquire the resource while watching the rest of the first audio visual content or after pausing the first audio visual content.

As shown in block 660, the system allows the user to acquire the one or more resources via the third party user interface. In some embodiments, the system may automatically prefill user information (e.g., contact information, billing information, shipping information, or the like) based on communicating with user device (e.g., mobile wallet application, online banking application, or the like) and/or entity system. The system allow the user to acquire the resource via the third party user interface via one or more authentication methods. In some embodiments, the system may allow the user to acquire the resource using digital tokens (e.g., Non-Fungible Tokens).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for analyzing using artificial intelligence engines depicted in audio visual content, the system comprising:
   at least one network communication interface;
   at least one non-transitory storage device; and
   at least one processing device coupled to the at least one non-transitory storage device and the at least one network communication interface, wherein the at least one processing device is configured to:
      determine that a user has accessed a first audio visual content on an audio visual content providing platform, in real-time;
      determine that the first audio visual content does not have embedded data in real-time;
      in response to determining that the first audio visual content does not have the embedded data, perform a frame-by-frame analysis of the first audio visual content in real-time to determine one or more resources depicted in the first audio visual content;
      determine a type of the one or more resources depicted in the first audio visual content via an artificial intelligence engine in real-time;
      identify one or more third party systems associated with the one or more resources based on determining the type of the one or more resources in real-time;
      crawl the one or more third party systems associated with the one or more resources in real-time;
      extract resource information associated with the one or more resources from the one or more third party systems based on crawling the one or more third party systems in real-time; and
      embed the resource information associated with the one or more resources in the first audio visual content, wherein embedding the resource information in the first audio visual content comprises tagging the resource information to the one or more resources in the first audio visual content in real-time.

2. The system of claim 1, wherein the at least one processing device is configured to:
   determine that the user is playing the first audio visual content in real-time; and
   display the resource information embedded in the first audio visual content in real-time.

3. The system of claim 2, wherein the at least one processing device is configured to display the resource information on the first audio visual content while the user is playing the first audio visual content.

4. The system of claim 2, wherein the at least one processing device is configured to display the resource information after determining that the user has paused the first audio visual content.

5. The system of claim 4, wherein the at least one processing device is configured to display the resource information on the first audio visual content, wherein the resource information overlaps the first audio visual content.

6. The system of claim 4, wherein the at least one processing device is configured to display the resource information on a separate user interface.

7. The system of claim 2, wherein the at least one processing device is configured to continuously track facial expressions, voice signatures, and one or more movements of the user while the user is playing the first audio visual content.

8. The system of claim 2, wherein the at least one processing device is configured to:
   in response to displaying the resource information, continuously track facial expressions, voice signatures, and one or more movements of the user;
   analyze the facial expressions, the voice signatures, and the one or more movements of the user to determine that the user is interested in acquiring the one or more resources associated with the resource information displayed to the user; and
   automatically redirect the user to a third party user interface provided by the one or more third party systems associated with the one or more resources.

9. The system of claim 1, wherein the audio visual content providing platform is a web based application.

10. The system of claim 1, wherein the audio visual content providing platform is a mobile application.

11. The system of claim 1, wherein the audio visual content providing platform is a streaming service platform.

12. A computer program product for analyzing using artificial intelligence engines depicted in audio visual content, the computer program product comprising a non-transitory computer-readable storage medium having computer executable instructions for causing a processing device to perform the steps of:
   determining that a user has accessed a first audio visual content on an audio visual content providing platform, in real-time;
   determining that the first audio visual content does not have embedded data in real-time;
   in response to determining that the first audio visual content does not have the embedded data, performing a frame-by-frame analysis of the first audio visual content in real-time to determine one or more resources depicted in the first audio visual content;
   determining a type of the one or more resources depicted in the first audio visual content via an artificial intelligence engine in real-time;
   identifying one or more third party systems associated with the one or more resources based on determining the type of the one or more resources in real-time;
   crawling the one or more third party systems associated with the one or more resources in real-time;

extracting resource information associated with the one or more resources from the one or more third party systems based on crawling the one or more third party systems in real-time; and embedding the resource information associated with the one or more resources in the first audio visual content, wherein embedding the resource information in the first audio visual content comprises tagging the resource information to the one or more resources in the first audio visual content in real-time.

13. The computer program product of claim 12, wherein the computer executable instructions cause the processing device to perform the steps of:

determining that the user is playing the first audio visual content in real-time; and displaying the resource information embedded in the first audio visual content in real-time.

14. The computer program product of claim 13, wherein the computer executable instructions cause the processing device to perform the step of displaying the resource information after determining that the user has paused the first audio visual content.

15. The computer program product of claim 12, wherein the computer executable instructions cause the processing device to perform the steps of:

in response to displaying the resource information, continuously tracking facial expressions, voice signatures, and one or more movements of the user;

analyzing the facial expressions, the voice signatures, and the one or more movements of the user to determine that the user is interested in acquiring the one or more resources associated with the resource information displayed to the user; and automatically redirecting the user to a third party user interface provided by the one or more third party systems associated with the one or more resources.

16. A computer implemented method for analyzing using artificial intelligence engines depicted in audio visual content, wherein the method comprises:

determining that a user has accessed a first audio visual content on an audio visual content providing platform in real-time;

determining that the first audio visual content does not have embedded data in real-time;

in response to determining that the first audio visual content does not have the embedded data, performing a frame-by-frame analysis of the first audio visual content in real-time to determine one or more resources depicted in the first audio visual content;

determining a type of the one or more resources depicted in the first audio visual content via an artificial intelligence engine in real-time;

identifying one or more third party systems associated with the one or more resources based on determining the type of the one or more resources in real-time;

crawling the one or more third party systems associated with the one or more resources in real-time;

extracting resource information associated with the one or more resources from the one or more third party systems based on crawling the one or more third party systems in real-time; and embedding the resource information associated with the one or more resources in the first audio visual content, wherein embedding the resource information in the first audio visual content comprises tagging the resource information to the one or more resources in the first audio visual content in real-time.

17. The computer implemented method of claim 16, wherein the method comprises:

determining that the user is playing the first audio visual content in real-time; and displaying the resource information embedded in the first audio visual content in real-time.

18. The computer implemented method of claim 17, wherein the method comprises displaying the resource information on the first audio visual content while the user is playing the first audio visual content.

19. The computer implemented method of claim 17, wherein the method comprises displaying the resource information after determining that the user has paused the first audio visual content.

20. The computer implemented method of claim 16, wherein the method comprises:

in response to displaying the resource information, continuously tracking facial expressions, voice signatures, and one or more movements of the user;

analyzing the facial expressions, the voice signatures, and the one or more movements of the user to determine that the user is interested in acquiring the one or more resources associated with the resource information displayed to the user; and automatically redirecting the user to a third party user interface provided by the one or more third party systems associated with the one or more resources.

* * * * *